United States Patent
Darrington et al.

(10) Patent No.: US 9,417,909 B2
(45) Date of Patent: Aug. 16, 2016

(54) SCHEDULING WORK IN A MULTI-NODE COMPUTER SYSTEM BASED ON CHECKPOINT CHARACTERISTICS

(75) Inventors: David L. Darrington, Rochester, MN (US); Matthew W. Markland, Rochester, MN (US); Philip James Sanders, Rochester, MN (US); Richard Michael Shok, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2407 days.

(21) Appl. No.: 12/270,164

(22) Filed: Nov. 13, 2008

(65) Prior Publication Data
US 2010/0122256 A1 May 13, 2010

(51) Int. Cl.
*G06F 9/48* (2006.01)
*G06F 9/50* (2006.01)
*G06F 11/14* (2006.01)

(52) U.S. Cl.
CPC ............. *G06F 9/485* (2013.01); *G06F 9/4881* (2013.01); *G06F 9/5038* (2013.01); *G06F 11/1438* (2013.01)

(58) Field of Classification Search
USPC ........................................................ 709/201
See application file for complete search history.

(56) References Cited

U.S. PATENT DOCUMENTS

| | | | |
|---|---|---|---|
| 2006/0168473 A1* | 7/2006 | Sahoo et al. | 714/15 |
| 2008/0216089 A1* | 9/2008 | Jia et al. | 719/312 |
| 2009/0043873 A1* | 2/2009 | Barsness et al. | 709/223 |
| 2009/0300623 A1* | 12/2009 | Bansal et al. | 718/102 |
| 2010/0011026 A1* | 1/2010 | Saha et al. | 707/200 |

* cited by examiner

Primary Examiner — Tom Y Chang
(74) Attorney, Agent, or Firm — Martin & Associates, LLC; Bret J. Petersen

(57) ABSTRACT

Efficient application checkpointing uses checkpointing characteristics of a job to determine how to schedule jobs for execution on a multi-node computer system. A checkpoint profile in the job description includes information on the expected frequency and duration of a check point cycle for the application. The checkpoint profile may be based on a user/administrator input as well as historical information. The job scheduler will attempt to group applications (jobs) that have the same checkpoint profile, on the same nodes or group of nodes. Additionally, the job scheduler may control when new jobs start based on when the next checkpoint cycle(s) are expected. The checkpoint monitor will monitor the checkpoint cycles, updating the checkpoint profiles of running jobs. The checkpoint monitor will also keep track of an overall system checkpoint profile to determine the available checkpointing capacity before scheduling jobs on the cluster.

8 Claims, 4 Drawing Sheets

SCHEDULING WORK IN A MULTI-NODE COMPUTER SYSTEM BASED ON CHECKPOINT CHARACTERISTICS

BACKGROUND

1. Technical Field

The disclosure and claims herein generally relate to multi-node computer systems, and more specifically relate to scheduling work in a multi-node computer system based on checkpoint characteristics for an application stored in a checkpoint profile.

2. Background Art

Supercomputers and other multi-node computer systems continue to be developed to tackle sophisticated computing jobs. One type of multi-node computer systems begin developed is a High Performance Computing (HPC) cluster called a Beowulf Cluster. A Beowulf Cluster is a scalable performance cluster based on commodity hardware, on a private system network, with open source software (Linux) infrastructure. The system is scalable to improve performance proportionally with added machines. The commodity hardware can be any of a number of mass-market, stand-alone compute nodes as simple as two networked computers each running Linux and sharing a file system or as complex as 1024 nodes with a high-speed, low-latency network.

A Beowulf cluster is being developed by International Business Machines Corporation (IBM) for the US Department of Energy under the name Roadrunner. Chips originally designed for video game platforms work in conjunction with systems based on x86 processors from Advanced Micro Devices, Inc. (AMD). IBM System x™ 3755 servers based on AMD Opteron™ technology are deployed in conjunction with IBM BladeCenter® H systems with Cell Enhanced Double precision (Cell eDP) technology. Designed specifically to handle a broad spectrum of scientific and commercial applications, the Roadrunner supercomputer design includes new, highly sophisticated software to orchestrate over 13,000 AMD Opteron™ processor cores and over 25,000 Cell eDP processor cores. The Roadrunner supercomputer will be capable of a peak performance of over 1.6 petaflops (or 1.6 thousand trillion calculations per second). The Roadrunner system will employ advanced cooling and power management technologies and will occupy only 12,000 square feet of floor space.

As the size of clusters continues to grow, the mean time between failures (MTBF) of clusters drop to the point that runtimes for an application may exceed the MTBF. Thus, long running jobs may never complete. The solution to this is to periodically checkpoint application state so that applications can be re-started and continue execution from known points. Typical checkpointing involves bringing the system to a know state, saving that state, then resuming normal operations. Restart involves loading a previously saved system state, then resuming normal operations. MTBF also limits systems scaling. The larger a system is, the longer it takes to checkpoint. Thus efficient checkpointing is critical to support larger systems. Otherwise, large systems would spend all of the time checkpointing.

What is needed are efficient checkpointing methods for multi node clusters. In a shared node cluster there may be many applications or jobs running simultaneously on a given node. Some of these application may want checkpoint support, others may not. The required frequency of checkpointing may also vary. Without a way to more efficiently checkpoint applications, multi-node computer systems will continue to suffer from reduced efficiency.

BRIEF SUMMARY

An apparatus and method is described for scheduling work based on checkpointing characteristics stored in a checkpoint profile for a High Performance Computing (HPC) cluster such as a Beowulf multi-node computing system. The checkpoint profile associated with an application or job includes information on the expected frequency and duration of a check point cycle for the application. The information in the checkpoint profile may be based on a user/administrator input as well as historical information. The job scheduler will attempt to group applications (jobs) that have the same checkpoint profile, on the same nodes or group of nodes. Additionally, the job scheduler may control when new jobs start based on when the next checkpoint cycle(s) are expected. The checkpoint monitor will monitor the checkpoint cycles, updating the checkpoint profiles of running jobs. The checkpoint monitor will also keep track of an overall system checkpoint profile to determine the available checkpointing capacity before scheduling jobs on the cluster.

The description and examples herein are directed to a HPC cluster such as the Roadrunner computer system, but the claims herein expressly extend to other Beowulf clusters and other multiple node computer systems such as the Blue Gene computer system also by IBM.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

An apparatus and method is described for efficient application checkpointing by using checkpointing characteristics stored in a checkpoint profile to determine how to schedule jobs for execution on a High Performance Computing (HPC) cluster such as a Beowulf multi-node computing system. The checkpoint profile associated with the job includes information on the expected frequency and duration of a check point cycle for the application. The information in the checkpoint profile may be based on a user/administrator input as well as historical information. The examples herein will be described with respect to the Roadrunner parallel computer developed by International Business Machines Corporation (IBM).

Figure 1:
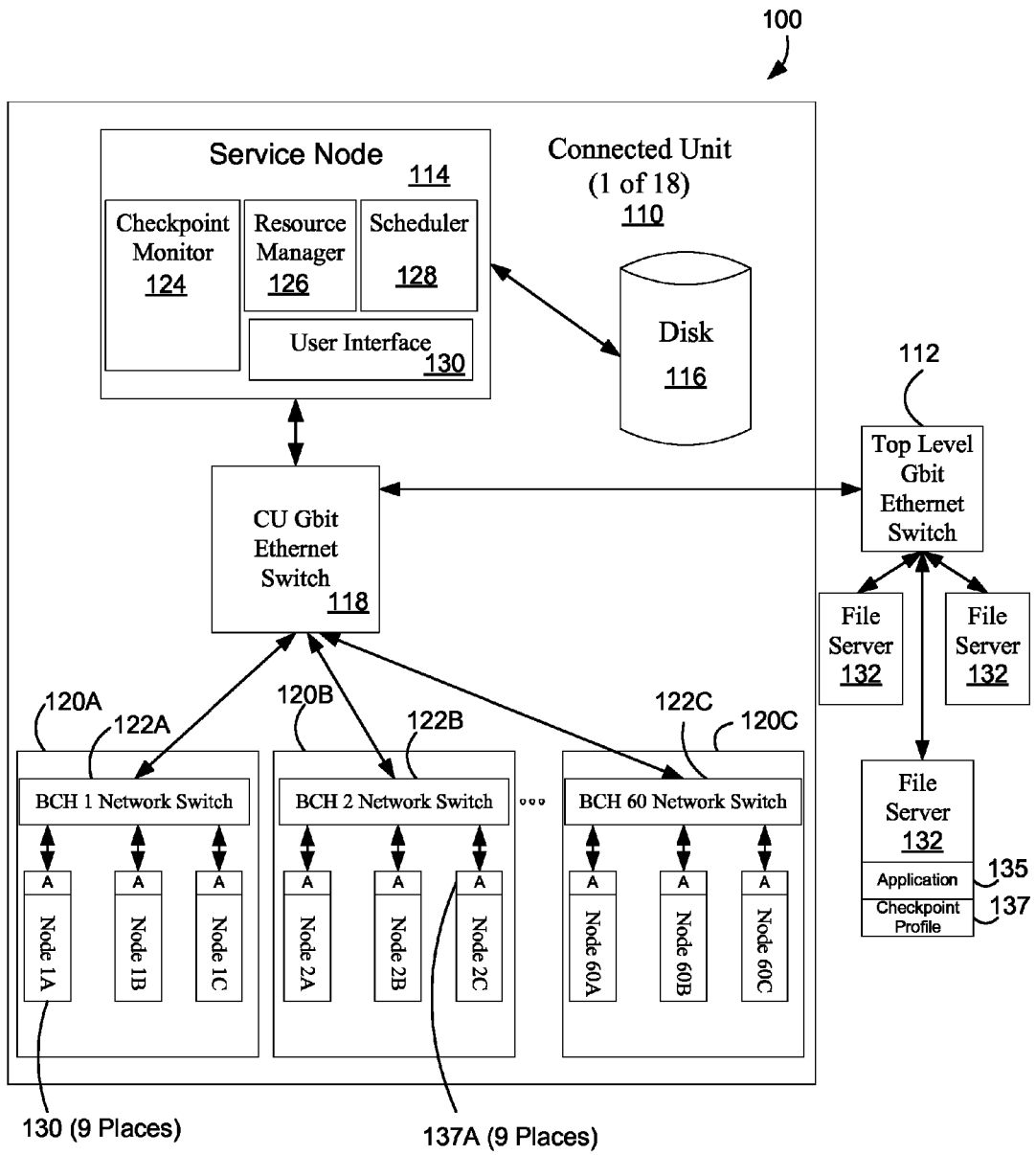
FIG. 1 is a block diagram of a multi-node computer system known as Roadrunner with a job scheduler that uses checkpointing characteristics to determine how to schedule jobs for execution.

FIG. 1 shows a block diagram that represents a multi-node computer system 100 such as the Roadrunner cluster computer system. The Roadrunner computer system 100 consists of eighteen connected units 110 that communicate through a top level gigabit (Gbit) Ethernet switch 112. Each of the connected units 110 includes a substantial amount of equipment housed in 16 computer racks. A single connected unit (CU) 110 is illustrated in the figures for simplicity. The connected unit includes a service node 114 that communicates with a disk storage unit 116. The Beowulf cluster is sometimes referred to as a "diskless" cluster because the individual nodes do not have disk storage. The service node 114 further communicates over a CU Gbit Ethernet switch 118 to a number of blade center chassis (BCH) 120A-C.

Each connected unit 110 typically has 60 BCHs. BCH1 120A, BCH2 120B and BCH60 120C are shown in FIG. 1 for illustration. Each BCH has three nodes 130. In Roadrunner, the nodes are sometime referred to as "hybrid nodes" since they each have three "blades". A "blade" is a circuit board with one or more processors and related circuits such as processor memory. In Roadrunner, there are Opteron Blades (model LS21) and Cell eDP Blades (Model QS22). The LS21 has 2 Dual core Opteron chips, and the QS22 has 2 dual core Cell eDP chips. A 'hybrid node' is composed of 1 LS21 and 2 QS22 blades.

Each BCH 120A-C has a network switch 122A-C that is connected to the CU Gbit Ethernet switch 118 to allow each BCH to communicate with any other BCH in the CU 110. Further, a BCH 120A-C can communicate with a BCH in another CU (not shown) through the top level switch 112. The top level switch 112 is also a Gbit Ethernet switch. The top level switch 112 connects the connected units 110 to a number of file servers 132. The file servers 132 include a number of stored applications 134 and corresponding checkpoint profiles 137 as described further below.

Again referring to FIG. 1, the multi-node computer system 100 includes a service node 114 that handles the loading of the nodes with software and controls the operation of the CU. The service node 114 includes a checkpoint monitor 124, a resource manager 126, a scheduler 128 and a user interface 130. The job scheduler 128 in the service node handles allocating and scheduling work and data placement on the compute nodes 130. The job scheduler 128 loads a job from disk storage 116 or from the file servers 132 for placement on the compute nodes. The job scheduler 128 uses the contents of the checkpoint profile 137 to determine when and where to load the application or job as described herein. The user interface 130 is used by the system administrator to control system functions such as described further below. The resource manager 126 manages and monitors resources used by the system including the disk 116, Ethernet switches 118, 112 and the file servers 132. The checkpoint monitor 124 monitors the checkpointing process for each application and updates the checkpoint profile 137 as described further below. The service node 114 is shown as a part of the connected unit 110. Alternatively, some or all of functions of the service node may be located in a management unit (not shown) that is at the top level of the system 100 and is connected to the top level Gbit Ethernet switch 112.

Figure 2:
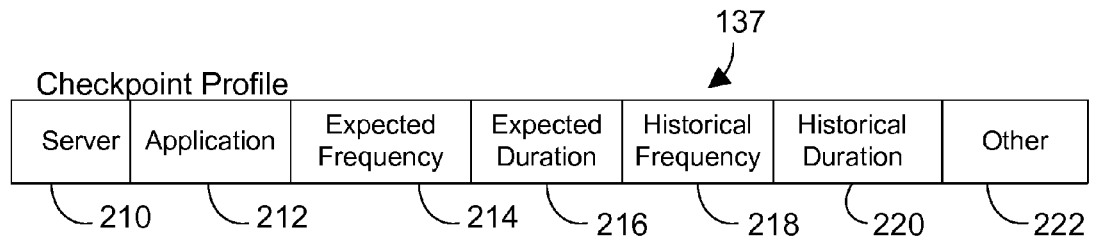
FIG. 2 is a block diagram of a checkpoint profile.

FIG. 2 illustrates a block diagram that represents an example of a checkpoint profile 137 (also shown in FIG. 1). The checkpoint profile 137 contains information related to a job or application 135 on the file server 132. The checkpoint profile 137 is created prior to or at the time of the process of checkpointing. The checkpoint profile may be a single file for checkpoint information for many jobs or each job may store a checkpoint profile in a as part of job description associated with the file. The checkpoint profiles could be created by a system administrator using the user interface 130 or by the checkpoint monitor 124. The checkpoint profiles 137 in the illustrated example contain a reference to a server 210, an application or job name 212, an expected frequency 214, an expected duration 216, a historical frequency 218, a historical duration 220, and any other similar data 222. The expected frequency 214 is the frequency that the application is expected to require or request checkpointing. This value may be set by the system administrator when the application is set up to run on the system. Similarly, the expected duration 216 is the estimated amount of time required to perform checkpointing of the application. The historical frequency 218 reflects the frequency of checkpointing requested by the application as determined by the checkpoint monitor 124 (FIG. 1). The historical duration 220 reflects the duration or time required to checkpoint the application in the past as determined by the checkpoint monitor 124. The historical frequency and duration may be stored as an average or other similar representation to reflect the measured values.

As described herein, the job scheduler 128 schedules jobs for execution on a HPC based on the checkpoint profile to increase the performance of the HPC by managing the checkpointing process. When jobs are checkpointing, the overhead from checkpointing might affect the performance of other jobs on the cluster. By synchronizing the checkpointing activity within a segment of the cluster, the affect on other jobs can be managed. Similarly, checkpointing can be managed to prevent too many jobs checkpointing simultaneously, which could saturate network/IO resources to the point where checkpoint either fails, or is too slow. The examples below illustrate some of the possibilities for scheduling work in a HPC based on application checkpoint characteristics stored in a checkpoint profile. In a shared node cluster, the job scheduler will attempt to group applications (jobs) that have the same or similar checkpoint profile, on the same nodes or group of nodes. Additionally, the job scheduler may control when new jobs start based on when the next checkpoint cycle(s) are expected.

A first example of scheduling work based on application checkpoint characteristics stored in a checkpoint profile is illustrated in FIG. 1. In this example, all the nodes 130 are assigned to the same type of checkpoint profile 137A. This means that all the nodes 130 in this connected unit 110 will have applications that have a similar checkpoint profile, in this case identified as checkpoint profile "A" 137A shown in each node 130. The checkpoint profiles are considered to be similar where the frequency and duration parameters are within a preferred range.

Figure 3:
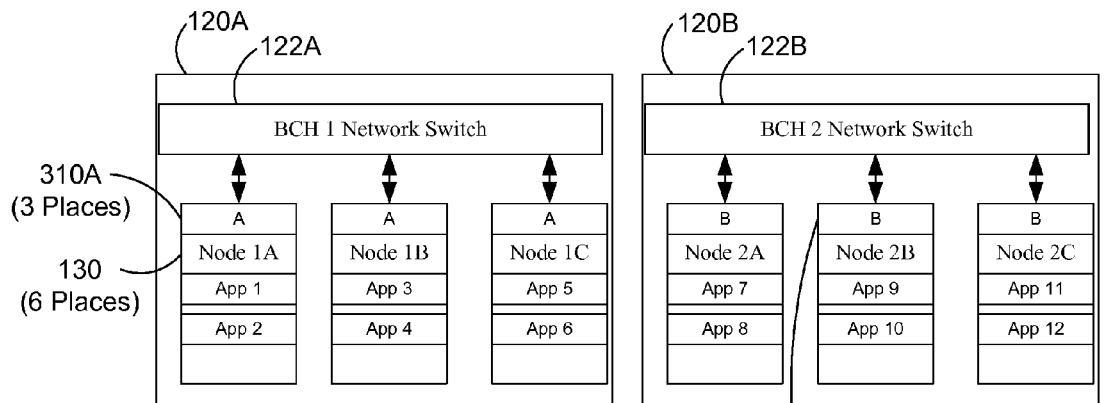
FIG. 3 is a block diagram showing two groups of nodes of a multi-node computer system known as Roadrunner.

FIG. 3 show a second example of scheduling work based on application checkpoint characteristics stored in a checkpoint profile. FIG. 2 represents a portion of a connect unit 110 of a HPC 100 as shown in FIG. 1. In this example, all the nodes 130 in a BCH are assigned to the same type of checkpoint profile. In this example, BCH1 122A is assigned to checkpoint profile "A" 310A and BCH2 122B is assigned to checkpoint profile "B" 310B. Thus, applications App1 through App6 have a checkpoint profile of type "A" 310A and applications App7 through App12 have a checkpoint profile of type "B" 310B.

Figure 4:
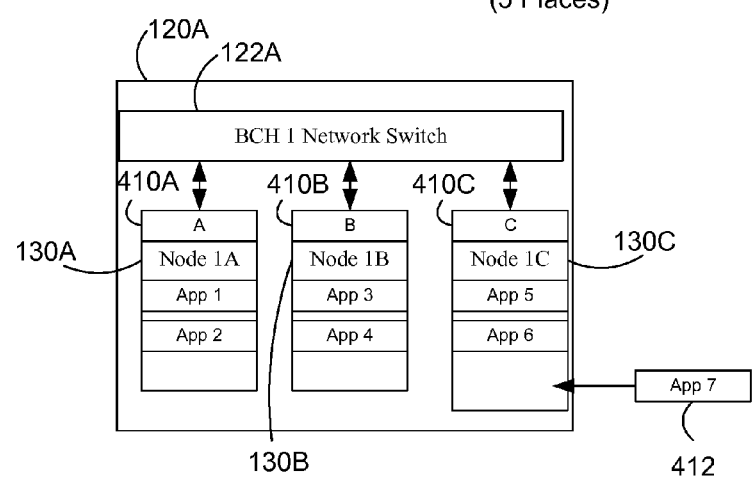
FIG. 4 is a block diagram showing a groups of nodes of a multi-node computer system known as Roadrunner.

FIG. 4 shows another example of scheduling work based on application checkpoint characteristics stored in a checkpoint profile. FIG. 4 represents a portion of a connect unit 110 of a HPC 100 as shown in FIG. 1. In this example, each of the nodes 130 in a BCH are assigned to a different type of checkpoint profile. In this example, Node1A 130A is assigned to checkpoint profile "A" 410A and NodeB 130B is assigned to checkpoint profile "B" 410B, and NodeC 130C is assigned to checkpoint profile "C" 410C. Thus, applications App1 and App2 have a checkpoint profile of type "A" 410A, applications App3 and App4 have a checkpoint profile of type "B" 410B, and applications App5 and App6 have a checkpoint profile of type "C" 410C.

As mentioned above, the job scheduler may control when new jobs start based on when the next checkpoint cycle(s) are expected. In FIG. 4, the job scheduler determines when to place and start new application App7 412 onto a node based on the status of the checkpoint cycle of the applications already on the node. In this case, the checkpoint profile of all applications on Node1C would be used to determine when to place and start App7 412. This may be done to ensure that checkpointing of the new job would 'sync up' with the checkpointing cycles of the other jobs running in the same node(s). This way, no nodes already running jobs would be slowed down by the checkpoint activity.

In another scenario, the scheduler may want to avoid syncing up the checkpoint cycles of jobs running together on a node or group of nodes. For example, if the jobs running on the node or group of nodes do not use much network bandwidth, more system checkpointing that uses a large amount of network bandwidth may not affect the performance of those jobs. In this case, it would be advantageous to make sure the checkpointing does not 'sync up', so that the load on the file servers and networks is spread out.

The checkpoint monitor with the job scheduler may also keep track of an overall system checkpoint profile to determine the available checkpointing capacity before scheduling jobs on the cluster. If the scheduler determines that the checkpointing overhead of the system exceeds a configurable threshold and over-commits the network, new jobs may not enter the system, or sections of the cluster. To do so may saturate IO/network resources during checkpoint cycles. The checkpoint monitor also uses information created during the checkpoint process. The checkpointing process typically stores progress messages in a log file. For example, when the checkpoint process begins and ends. The checkpoint monitor uses these messages to determine when to begin and end a timer that will reflect the time used for the checkpoint process. Similarly, the checkpoint monitor uses the messages to determine when to set and reset counters that store the volume or loading of the network during checkpointing of the job. The timer and counters are typically done in software but could also be realized in hardware.

Figure 5:
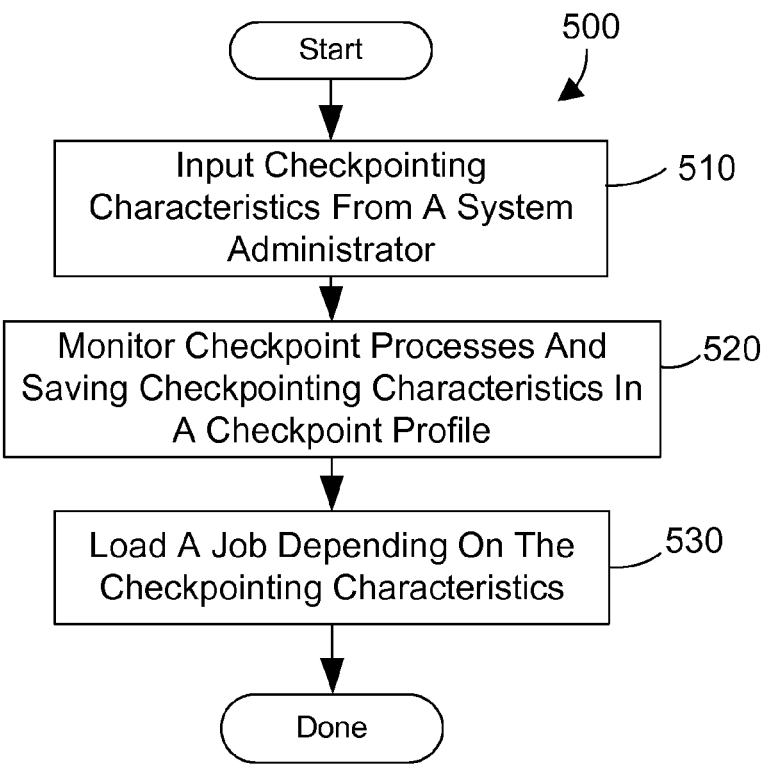
FIG. 5 is a method flow diagram for a loading a job depending on checkpointing characteristics on a multi-node computer system.

FIG. 5 shows a method 500 for efficient checkpointing that schedules jobs for execution based on checkpoint characteristics in a checkpoint profile. The steps in method 500 are preferably performed by the job scheduler 128 in the service node 114 (FIG. 1) in conjunction with the checkpoint monitor 124. The method begins by inputting checkpointing characteristics from a system administrator for one or more applications or jobs to be run on the system (step 510). Next, monitor checkpoint processes and saving checkpointing characteristics in a checkpoint profile (step 520). Then load a job into a node depending on the checkpointing characteristics (step 530). The method is then done.

Figure 6:
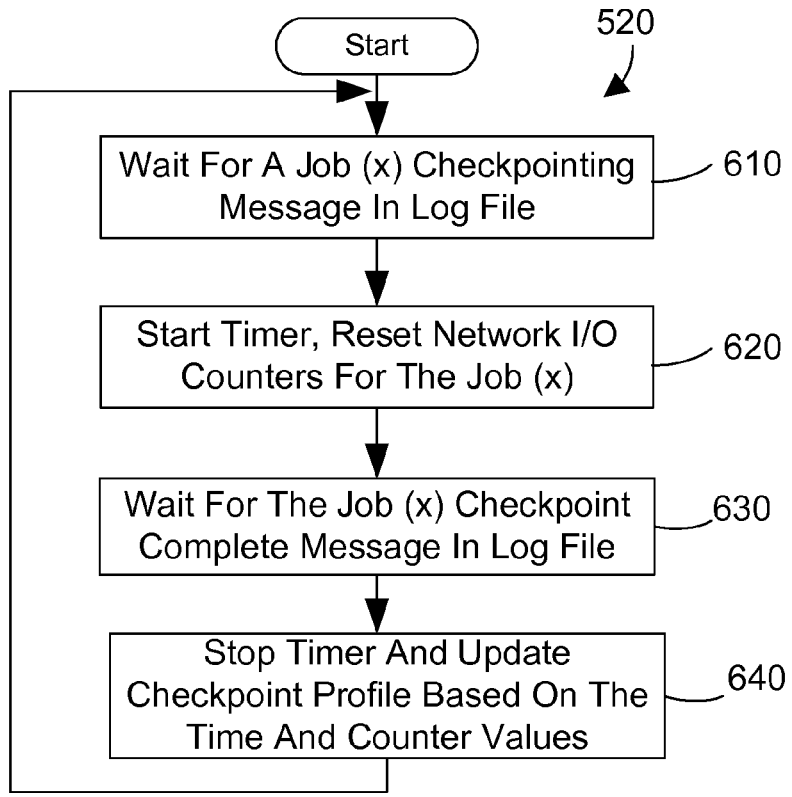
FIG. 6 is a method flow diagram for a checkpoint monitor to monitor checkpointing on a multi-node computer system.

FIG. 6 shows a method 520 as one possible implementation of step 520 in method 500 for efficient application checkpointing. The steps in method 520 are preferably performed by the checkpoint monitor 124 in the service node 114 (FIG. 1). The method 520 would typically be run as a continuous loop to monitor the checkpointing process of jobs executing on the system. The method begins by waiting for a job (x) checkpointing message in a log file (step 610). In this example, "x" is a reference variable indicating there may be many jobs executing. Next, start a timer and reset the I/O counters that monitor the I/O use for job (x) (step 620). Then, wait for a job (x) checkpoint complete message in the log file (step 630). Then stop the timer and update the checkpoint profile for job (x) based on the timer and the counter values (step 640). The method then repeats.

Figure 7:
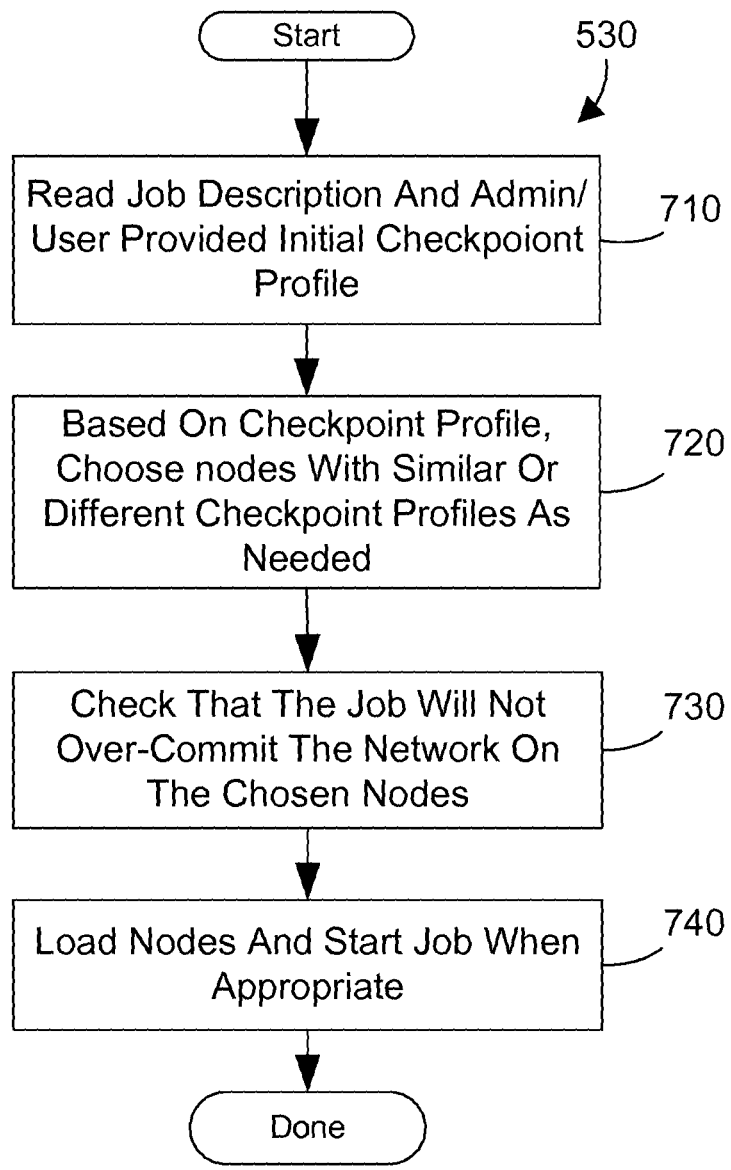
FIG. 7 is a method flow diagram for a job scheduler to schedule jobs on a multi-node computer system based on the checkpoint profile for the application.

FIG. 7 shows a method 530 as one possible implementation of step 530 in Method 500 for efficient application checkpointing. The steps in method 530 are preferably performed by the job scheduler 128 in the service node 114 (FIG. 1) in conjunction with the checkpoint monitor 124 upon receipt of a job scheduling request. First, the method reads the job description with the checkpoint profile as set up by the system administrator or user that provides an initial checkpoint profile (step 710). Next, based on the checkpoint profile choose nodes with similar or different checkpoint profiles as needed where the job can be placed in the system (step 720). Then, check the job will not over-commit the network on any chosen nodes (step 730), and then load the job into a node depending on the checkpointing characteristics of the job and the checkpointing characteristics of the jobs running on the nodes where the job is to be loaded and start the node when appropriate (step 740). The method is then done.

An apparatus and method is described herein to schedule work on a multi-node computer system such as a HPC based on application checkpoint characteristics stored in a checkpoint profile to increase the efficiency of the cluster. In a shared node cluster where many applications are running simultaneously, with different checkpoint requirements, the scheduler uses the checkpoint profile to optimize overall cluster performance by placing applications with similar checkpoint profiles on the same node or group of nodes.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A multi-node computer system comprising:
a plurality of compute nodes that each comprises a processor and memory;
a network connecting the plurality of compute nodes;
a checkpoint monitor that monitors a plurality of jobs executing on the computer system during checkpointing and stores checkpoint characteristics for each job in a plurality of checkpoint profiles; and
a job scheduler that determines when and where to load a new job into the plurality of compute nodes depending on the checkpoint characteristics in the plurality of checkpoint profiles, wherein the job scheduler loads the new job into one or more compute nodes that has one or more jobs executing with similar checkpoint characteristics as the checkpoint characteristics for the new job.

2. The multi-node computer system of claim 1 wherein the one or more compute nodes is chosen from the following: the nodes in a connected unit, the nodes connected to the same network switch, and a single node.

3. A multi-node computer system comprising:
a plurality of compute nodes that each comprises a processor and memory;
a network connecting the plurality of compute nodes;
a checkpoint monitor that monitors a plurality of jobs executing on the computer system during checkpointing and stores checkpoint characteristics for each job in a plurality of checkpoint profiles; and a job scheduler that determines when and where to load a new job into the plurality of compute nodes depending on the checkpoint characteristics in the plurality of checkpoint profiles, wherein the job scheduler loads the new job based on the checkpoint characteristics for the job and starts the new job at a time depending on when the next checkpoint cycle for other jobs on the group of nodes is expected.

4. A computer implemented method for scheduling work in a high performance, multi-node computer system with a plurality of nodes based on checkpoint characteristics, the method comprising the steps of:

monitoring checkpointing of a plurality of jobs and saving checkpointing characteristics in a plurality of checkpoint profiles for the plurality of jobs; and determining when and where to load a new job on the plurality of nodes in the computer system depending on the checkpoint characteristics in the plurality of checkpoint profiles; and loading the job onto a node, wherein the step of loading the new job includes loading the new job into one or more compute nodes that have similar checkpoint characteristics as the new job.

5. A computer implemented method for scheduling work in a high performance, multi-node computer system with a plurality of nodes based on checkpoint characteristics, the method comprising the steps of:

monitoring checkpointing of a plurality of jobs and saving checkpointing characteristics in a plurality of checkpoint profiles for the plurality of jobs; and determining when and where to load a new job on the plurality of nodes in the computer system depending on the checkpoint characteristics in the plurality of checkpoint profiles; and loading the job onto a node, wherein the step of loading the new job includes loading the new job into one or more compute nodes that have different checkpoint characteristics as the new job.

6. A computer implemented method for scheduling work in a high performance cluster computer system based on checkpoint characteristics, the method comprising the steps of:

inputting expected checkpoint characteristics for a new job from a system administrator including an expected frequency of checkpointing, an expected duration of checkpointing;

monitoring checkpointing of a plurality of jobs and saving checkpointing characteristics in a plurality of checkpoint profiles which include a historical frequency of checkpointing, and a historical duration of checkpointing;

reading a checkpoint profile for the new job;

choosing at least one node depending on the checkpoint profile of the new job and the checkpoint profiles of the plurality of jobs to group jobs that have a similar checkpoint profile;

checking that the new job does not over commit the network to the chosen at least one nodes;

loading the chosen nodes with the new job;

starting the new job.

7. A non-transitory computer-readable storage medium with an executable program thereon, wherein the program instructs a processor to provide:

a checkpoint monitor that monitors a plurality of jobs on a multi-node computer system with a plurality of nodes during checkpointing and stores checkpoint characteristics for the plurality of jobs in a plurality of checkpoint profiles;

a job scheduler that determines when and where to load a new job into a node of the plurality of compute nodes depending on the checkpoint characteristics in the plurality of checkpoint profiles, wherein the job scheduler loads the new job based on the checkpoint characteristics for the job into one or more compute nodes that have jobs with similar checkpoint characteristics.

8. A non-transitory computer-readable storage medium with an executable program thereon, wherein the program instructs a processor to provide:

a checkpoint monitor that monitors a plurality of jobs on a multi-node computer system with a plurality of nodes during checkpointing and stores checkpoint characteristics for the plurality of jobs in a plurality of checkpoint profiles;

a job scheduler that determines when and where to load a new job into a node of the plurality of compute nodes depending on the checkpoint characteristics in the plurality of checkpoint profiles, wherein the job scheduler loads the new job based on the checkpoint characteristics for the job and starts the new job at a time depending on when the next checkpoint cycle for other jobs on the group of nodes is expected.

* * * * *